June 19, 1956     P. E. R. FAUVELOT     2,750,801
ALTIMETER WITH BAROMETRIC CORRECTION TOTALIZING DEVICE
Filed Nov. 8, 1954     3 Sheets-Sheet 1

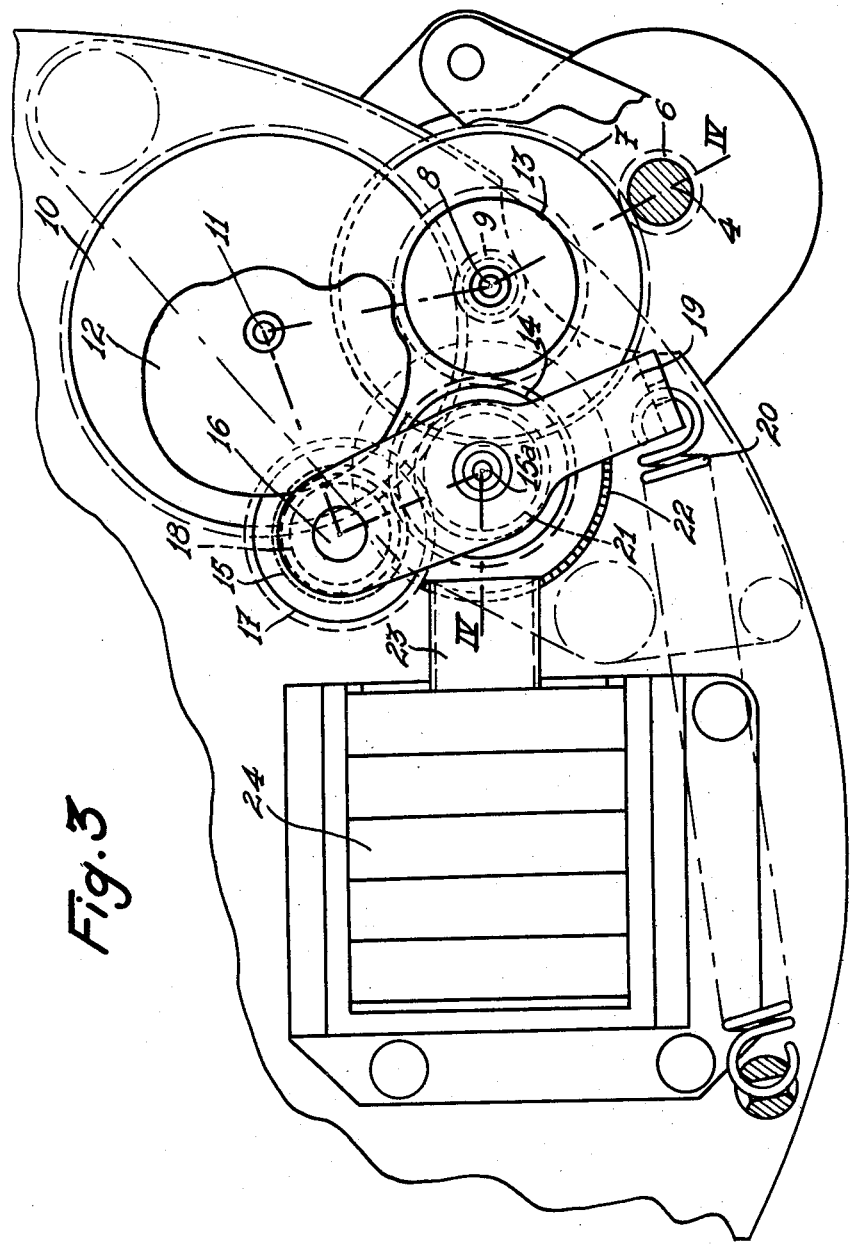

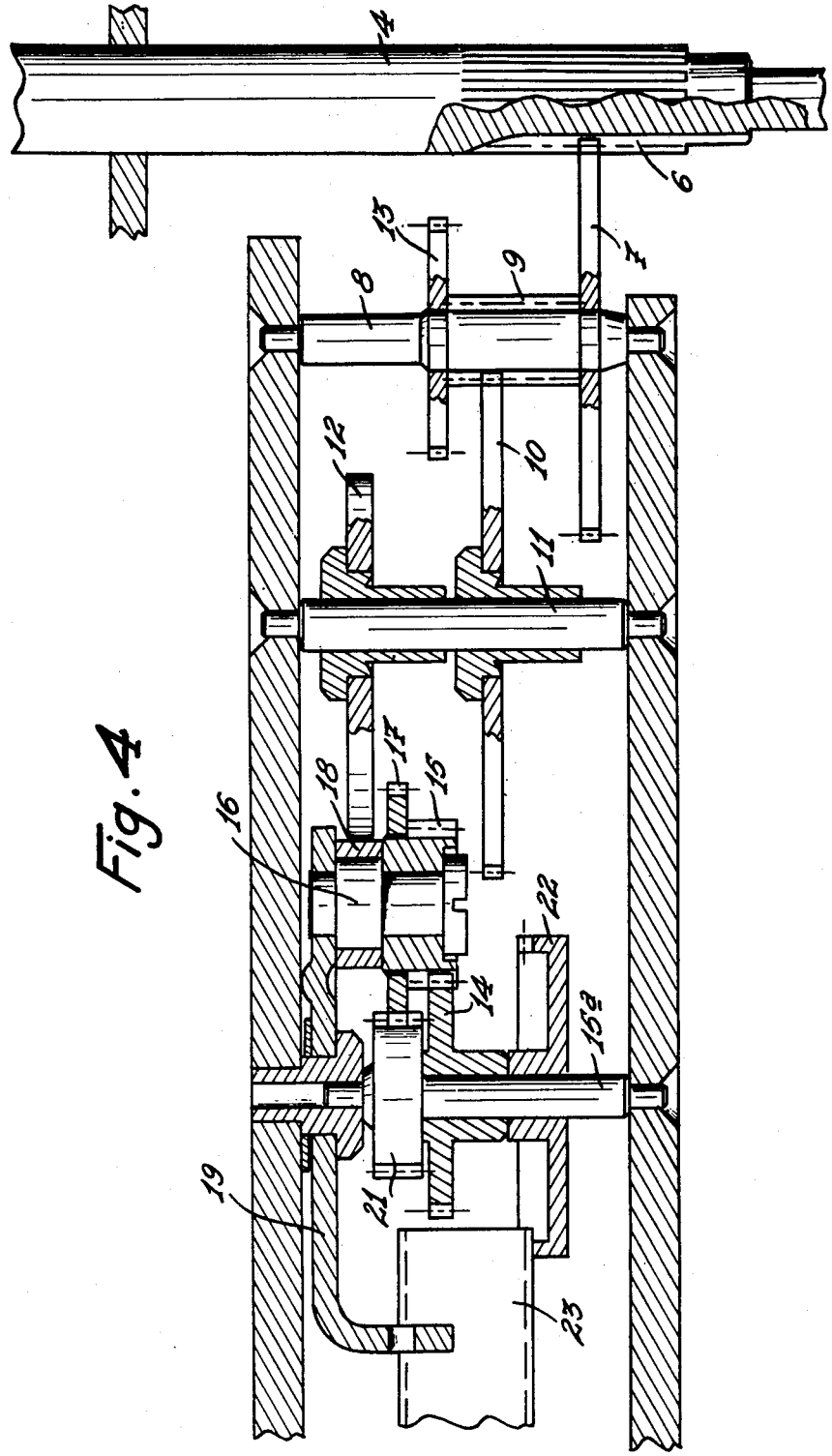

United States Patent Office 2,750,801
Patented June 19, 1956

2,750,801

ALTIMETER WITH BAROMETRIC CORRECTION TOTALIZING DEVICE

Pierre Ernest Rene Fauvelot, Ville-d'Avray, France, assignor to Societe Anonyme Etablissements Ed. Jaeger, Levallois-Perret, France Application November 8, 1954, Serial No. 467,565

Claims priority, application France July 30, 1954

6 Claims. (Cl. 73—387)

This invention relates to barometric altimeters and more specifically to a totalizing device adapted to be associated with a barometric altimeter in view of effecting the correction of the reading thereof.

In barometric altimeters of the type utilized on board aircrafts a correction (which is a function of the actual or computed barometric pressure of the place where is the aircraft when the reading is observed) must be effected in order to find the true altitude. During a landing, this correction may be introduced in two different manners; the pilot may either simply introduce a barometric correction corresponding to the zero-altitude pressure of the place, and land by moving the altimeter index toward the indication of the altitude of the landing field, or, on the contrary, introduce an altimetric correction and a barometric correction so that during the landing the airfield altitude will correspond to the zero coincidence of the altimeter and of its indicating pointer. In all cases the required corrections may attain considerable values.

A first method of constructing an altimeter to which a barometric correction may be applied consists in providing a fixed dial for the altitude indications and a device enabling the index gearing and the instrument mechanism to be displaced bodily in relation to this dial. An auxiliary dial driven during the aforesaid displacement makes it possible to check and read the correction with respect to stationary index. Conversely, it is also possible to provide an index driven during this displacement and movable above or in front of a stationary dial indicating the applied correction.

Another known method consists in providing correction applying mechanism adapted through a differential gear train and without interfering with the mechanism of the altimeter, to shift the index gear relative to its driving axis, said differential gear train being operatively connected on the other hand wth a suitable indicating mechanism whereby the magnitude of the relative displacement may be read immediately and directly.

Of these known methods the former is characterized by a great simplicity but any checking of the correction applied, as read on the dial, is impractical and makes it difficult to appreciate with the desirable accuracy the added magnitude, whilst the other method broadly set forth hereinabove is relatively more elaborate but provides more reliable and practical readings since the corrections are generally registered on drum counters carrying peripheral digits appearing through adequate windows or apertures.

It is the essential object of this invention to avoid the drawbacks characterizing the various arrangements known in this field while retaining their advantageous features.

With this purpose in view, this invention provides means whereby an altimeter mechanism adapted to be moved bodily relative to a stationary frame and dial has associated therewith a device for shifting this mechanism which has its control means operatively connected to a direct-reading registering device adapted to show the applied correction magnitude by means of a drum counter the peripheral numerals of which appear through suitable windows or apertures.

According to one form of embodiment of the invention, the registering device is operated by a gear train providing a linear and therefore approximate correspondence between the pressures and altitudes, and by a complemental device correcting automatically the differences resulting from the non-linearity of the pressure-altitude law.

With this arrangement the correction reading is very accurate and constantly visible. Moreover, the application of barometric corrections of great magnitude is still possible without any risk of error, a feature not always encountered in mechanisms of the first type mentioned hereinabove.

In view of affording a clearer understanding of the invention and of the manner in which the same may be carried out in the practice, reference will now be made to the attached drawings showing diagrammatically by way of example one form of embodiment of the invention.

In the drawings:

Fig. 3 is a fragmentary view of a practical embodiment of this mechanism, one of the pivot plates being removed for the sake of clarity, and Fig. 4 is a diagrammatical developed view of the gears of Fig. 3, the development being made along the broken line IV—IV of Fig. 3.

Figure 1:
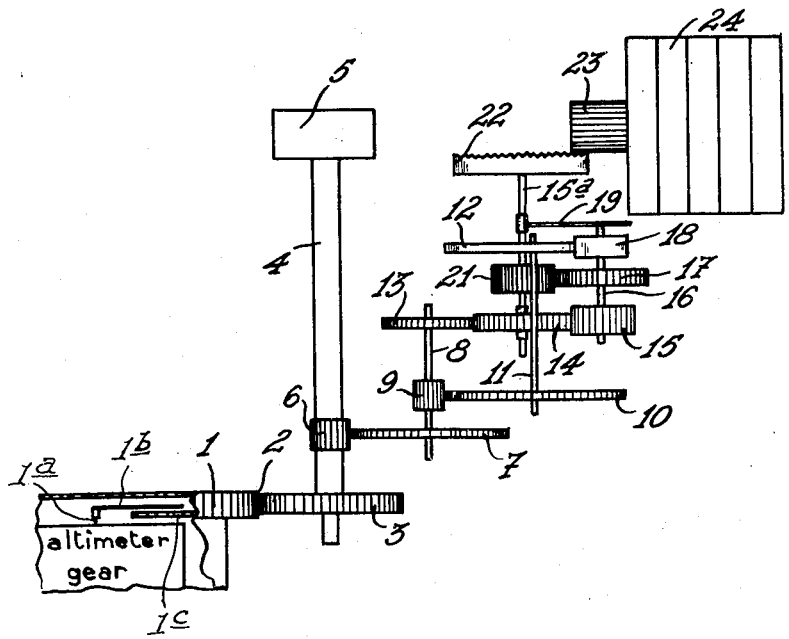
Fig. 1 shows diagrammatically in plane view the arrangement of the barometric correction totalizer driving gears.

The case 1 of an altimeter, which contains the gear work and the capsule element, is mounted according to the usual manner through adequate means, not shown, in a support enabling this case to pivot about an axis coincident with the centre axis 1a of the pointer 1b. To produce this pivotal movement the case 1 is provided with a set of peripheral teeth 2 meshing with a control gear wheel 3 secured on a spindle 4 carrying the control button 5 for applying the required barometric correction. This spindle 4 has secured thereon a control pinion 6 meshing with a gear wheel 7 of an intermediate unit carried by a common arbor 8. This intermediate unit also comprises a pinion 9 meshing with a gear wheel 10 secured on a shaft 11 carrying a cam 12 the profile of which represents the difference existing between the pressure-altitude law and a linear correspondence between pressures and altitudes at each point of said profile, taking into account the kinematics of the system.

The intermediate unit carries another gear wheel 13 engaging a sun gear 14 mounted for loose rotation on a spindle 15a. This sun gear 14 meshes in turn with the input planet pinion 15 of an epicyclic gear train the pivot 16 of which carries said pinion 15 and an output planet wheel 17. This pivot 16 also carries a loosely rotating roller 18 engaging the peripheral edge of cam 12. The epicyclic gear train is supported through its pivot 16 by a differential arm 19 pivoted freely on the spindle 15a and attached to a tension spring 20 urging the roller 18 against the peripheral or operative edge of cam 12.

The planet wheel 17 meshes with a sun wheel 21 secured on the spindle 15a. This spindle carries on the other hand a crown-wheel 22 meshing with a pinion 23 for driving a drum counter 24.

Figure 2:
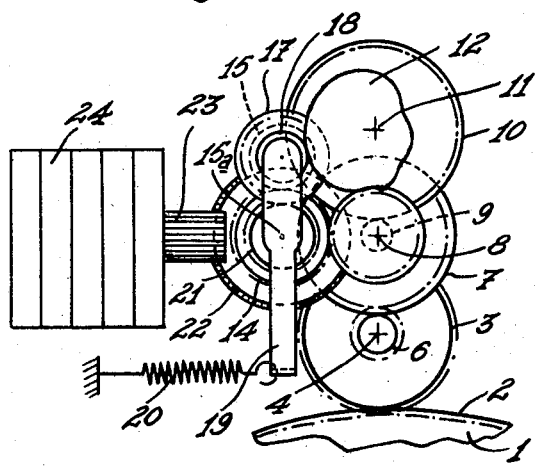
Fig. 2 is an elevational view of the same arrangement.

The arrangement described hereinabove operates as follows:

When the operator rotates the control button 5 in the desired direction the gear wheel 3 causes the case 1 carrying the gear work and the capsule element of the altimeter to rotate, so that the altimeter index 1b will move through an extent corresponding to the required correction in front of the dial 1c—assumed to be fixed—of the altimeter. At the same time, the rotational movement of button 5 is transmitted through the intermediate set carried by the arbor 8, with the proper set-up ratio, to the drums of the counter 24. Thus, the operator is able to cause the desired quantity, corresponding for example a given number of millibars, to appear through the reading apertures provided in front of the counter. This indication is corrected automatically due to the movement imparted to the cam 12 by the control button 5 through the pinion 9 and gear wheel 10, whereby a complemental angular movement is imparted to the roller 18 and to the planet carrier arm 19 inducing an additional and complemental rotation of the planet pinion 15 and planet wheel 17, so that the sun wheel 21 will be rotated through an additional extent, as will be clearly apparent from Figures 1 and 2.

Figures 3 and 4 of the drawings illustrate one practical form of embodiment of the mechanism described hereinabove, wherein conventional machine elements are utilized so that no further description will be required to afford a proper understanding of the device.

This mechanism preserves the simplicity of design of the altimeter gear work without adding thereto any complemental, intricate and power-consuming gearings. In fact, it is obvious that the driving power available in these instruments should be strictly metered if their precision and responsiveness are to be maintained. With the device of this invention it is also possible to display the barometric correction in a simple manner and on the other hand the reading of this indication will be readily effected remotely, the corresponding quantity standing in a sufficiently sharp contrast to the altimeter dial proper.

Of course, many modifications may be brought to the forms of embodiment shown and described herein, without departing however from the spirit and scope of the invention as per the appended claims.

What I claim is:

1. A barometric correction totalizing device for a barometric altimeter the mechanism of which is secured in a case adapted to be moved bodily relative to a stationary dial, and formed with a set of teeth, comprising, in combination, a barometric drum counter having a driving pinion and the barometric graduation of which appears through at least one window, a control gear wheel drivingly connected to the set of teeth formed on the altimeter mechanism case, a manual control device drivingly connected to said control gear wheel, a differential gear having a stationary shaft, a sun gear loosely mounted on said shaft and drivingly connected to said control gear wheel, a sun wheel secured on said shaft and drivingly connected to the driving pinion of the drum counter and an epicyclic device comprising a spindle, an input planet pinion carried by said spindle and meshing with said sun gear and an output planet wheel carried by said spindle and meshing with said sun wheel, and means for moving said epicyclic device about the periphery of said sun gear and sun wheel according to the difference existing between the pressure-altitude law and the linear correspondence between pressures and altitude given by said gears, wheels and pinions.

2. A barometric correction totalizing device, according to claim 1, wherein the means for pivoting the epicyclic device about the periphery of the sun gear and wheel comprises a flat cam the profile of which represents the difference existing between the pressure-altitude law and the linear correspondence between pressures and altitudes given by the gears, gear wheels and pinions, taking into account the kinematics of said gear elements, a roller secured on the spindle of the epicyclic device and engaging the edge of said cam, a cam wheel drivingly connected to the control gear, an intermediate shaft carrying said flat cam and said cam wheel means for pivotally mounting said epicyclic device about the spindle thereof, and means for urging said roller against the edge of said cam.

3. A barometric correction totalizing device, according to claim 2, wherein the means for pivotally mounting the epicyclic device and for urging the roller against the cam comprise a differential arm loosely mounted around the shaft of the differential gear, and a tension spring attached to an extension of said arm and extending in a direction substantially orthogonal with respect to said shaft.

4. A barometric correction totalizing device, according to claim 1, wherein the sum wheel is drivingly connected to the driving pinion of the drum counter through a crown-wheel.

5. A barometric correction totalizing device, according to claim 1, wherein the connection between the sun gear and the control gear wheel comprises a pinion integral with the control gear wheel, and an intermediate set of gear wheels the input gear wheel of which meshes with said pinion while its output gear wheel meshes with the sun gear.

6. A barometric correction totalizing device for a barometric altimeter the mechanism of which is secured in a case adapted to be moved bodily relative to a stationary dial and formed with a set of teeth, comprising, in combination, a totalizer having a driving pinion and a barometric graduation which appears through at least one window, a stationary spindle, a control button secured at one end of said spindle, a control toothed wheel secured on said spindle and engaging the set of teeth formed on the altimeter mechanism case, a control pinion secured on said spindle; an intermediate unit comprising a stationary arbor, an intermediate toothed wheel carried by said arbor and engaging said control pinion, and an intermediate pinion and a second intermediate wheel respectively secured on said arbor; a differential gear train comprising a stationary shaft, a sun gear loosely mounted on said shaft and engaging said second intermediate wheel, a sun wheel secured on said shaft, and an epicyclic device having a pivot, a planet pinion and a planet wheel respectively secured on said pivot and meshing with said sun gear and sun wheel, respectively; a correction device comprising a differential arm carrying said pivot and loosely mounted on said shaft, a stationary cam shaft, a flat cam secured on said cam shaft and the profile of which represents the difference existing between the pressure-altitude law and the linear correspondence between pressures and altitudes given by the gears, wheels and pinions, taking into account the kinematics of said gear elements, a roller secured on said pivot and engaging the edge of said cam, and a tension spring attached to an extension of said differential arm and extending in a direction substantially orthogonal with respect to said pivot for urging said roller against the edge of the cam; and a crown-wheel carried by said shaft and meshing with the driving pinion of the totalizer.

References Cited in the file of this patent

UNITED STATES PATENTS

| | | |
|---|---|---|
| 2,024,314 | Urfer | Dec. 17, 1935 |
| 2,552,377 | Jenny | May 8, 1951 |
| 2,678,561 | Grandidge | May 18, 1954 |